US007050886B2

(12) United States Patent
Oberg et al.

(10) Patent No.: US 7,050,886 B2
(45) Date of Patent: May 23, 2006

(54) CHEMICAL DISPENSING SYSTEM FOR A PORTABLE CONCRETE PLANT

(75) Inventors: Neil G. Oberg, Milliken, CO (US); Jerome J. Doherty, Berthoud, CO (US)

(73) Assignee: Port-A-Pour, Inc., Berthoud, CO (US)

( * ) Notice: Subject to any disclaimer, the term of this patent is extended or adjusted under 35 U.S.C. 154(b) by 0 days.

(21) Appl. No.: 11/078,152

(22) Filed: Mar. 11, 2005

(65) Prior Publication Data

US 2005/0159843 A1 Jul. 21, 2005

Related U.S. Application Data

(62) Division of application No. 10/738,845, filed on Dec. 17, 2003, now Pat. No. 6,876,904.

(60) Provisional application No. 60/436,578, filed on Dec. 23, 2002.

(51) Int. Cl.
*G05D 7/00* (2006.01)

(52) U.S. Cl. ...................... 700/282; 700/265; 700/266; 700/275; 700/281; 700/283; 366/2; 366/6; 366/8; 366/16; 366/17

(58) Field of Classification Search ........ 700/265–266, 700/275, 281–283; 366/2, 6, 8, 16–17
See application file for complete search history.

(56) References Cited

U.S. PATENT DOCUMENTS

| | | | | |
|---|---|---|---|---|
| 4,209,131 | A * | 6/1980 | Barash et al. | 239/68 |
| 5,014,211 | A * | 5/1991 | Turner et al. | 700/239 |
| 5,332,366 | A * | 7/1994 | Anderson | 417/63 |
| 5,653,533 | A | 8/1997 | Green | |
| 5,695,280 | A * | 12/1997 | Baker et al. | 366/17 |
| 5,727,933 | A * | 3/1998 | Laskaris et al. | 418/2 |
| 5,826,749 | A * | 10/1998 | Howland et al. | 222/1 |
| 6,224,250 | B1 * | 5/2001 | Kreinheder et al. | 366/8 |
| 6,767,877 | B1 * | 7/2004 | Kuo et al. | 510/175 |
| 2003/0127534 | A1 * | 7/2003 | Firestone | 239/61 |

FOREIGN PATENT DOCUMENTS

| | | | |
|---|---|---|---|
| DE | 19732833 | A | 2/1998 |
| EP | 1118380 | A1 | 7/2001 |
| ES | 8506220 | A | 11/1985 |
| JP | 01156013 | | 6/1989 |

OTHER PUBLICATIONS

PCT/US 03/41052 PCT International Search Report May 24, 2004.

* cited by examiner

*Primary Examiner*—Anthony Knight
*Assistant Examiner*—Ronald D Hartman, Jr.
(74) *Attorney, Agent, or Firm*—Cochran Freund & Young LLC; William W. Cochran

(57) ABSTRACT

A computer controlled pumping and measuring system is used to dispense chemicals into a concrete mix. The redundant use of positive displacement pumps and flow meters ensure that any problems with the chemical dispensing are immediately caught. The computerized control system may be operable to control exact batch configurations of concrete and aggregate in conjunction with the chemical dispensing, as well as provide precise mixture control and recording of the various components.

1 Claim, 5 Drawing Sheets

CHEMICAL DISPENSING SYSTEM FOR A PORTABLE CONCRETE PLANT

CROSS REFERENCE TO RELATED APPLICATION

This application is a divisional of U.S. patent application Ser. No. 10/738,845 entitled "Portable Concrete Plant Dispensing System" by Neil G. Oberg and Jerome J. Doherty, filed Dec. 17, 2003 U.S. Pat. No. 6,876,904, which claims the benefit of and priority to U.S. Provisional Patent Application Ser. No. 60/436,578 entitled "Chemical Dispensing System" by Neil G. Oberg and Jerome J. Doherty, filed Dec. 23, 2002, the entirety of which is hereby specifically incorporated by reference for all it discloses and teaches.

BACKGROUND OF THE INVENTION a. Field of the Invention

The present invention pertains to concrete mixing plants and specifically to a chemical dispensing apparatus of a concrete mixing plant.

b. Description of the Background

Concrete batch plants measure and dispense cement, aggregate, and water into mixing drums. Often, the mixing drums are mounted on a truck for delivery at a jobsite. In many cases, special chemicals are mixed into the concrete to give the concrete special properties. For example, colorants, plasticizers, anti-freezing agents, accelerants, retarding agents, stabilizers, water reducers, and other chemicals may be added to the concrete to impart specific properties to the batch of concrete. Many different chemicals are used commercially in the concrete industry.

Chemicals may be required to achieve the structural performance of each batch of concrete. Because a substandard batch of concrete may mean structural failure of a building or structure, it has become common practice to have a concrete batch plant operator visually verify that the proper amounts of chemical additives have been added to each batch of concrete. Typically, the operator fills a container to the appropriate level of chemical and verifies the amount with a sight glass. The operator verifies that the required amount of chemical has been added by checking that the sight glass has changed to "0" level.

There are several problems with the standard method of chemical measuring and dispensing. Any manual process is prone to error. In the rush to produce many batches of concrete, it is easy for an operator to overlook a chemical additive or mis-measure the amount added to a specific batch. Another problem is that the chemicals may be added at different sequences of the batch preparation, causing a potential for overlooking the injection of a chemical.

Highly viscous chemicals can present another problem in that the level of fill at the sight gauge may not be indicative of what was actually dispensed in the measurement container. This will leave a false measurement and some question about the integrity of the system.

In some mixing plants, if a batch of concrete is being mixed and a problem occurs with the chemical dispensing, the batch may not be able to be stopped. A batch that is incorrectly mixed may have to be discarded in its entirety, causing a waste of time and materials.

SUMMARY OF THE INVENTION

The present invention overcomes the disadvantages and limitations of the prior art by providing a system and method for accurately and repeatably measuring and dispensing chemicals into a batch of concrete. Automated pumping and measuring devices coupled to a computer controller to dispense chemicals into a mixing drum prior to the addition of aggregate and concrete. The pumping and measuring devices are separate and independent devices so that redundant readings ensure that no errors occur during dispensing.

The present invention may therefore comprise a chemical dispensing system for a concrete mixing plant comprising: a first pump adapted to receive a first control signal from a computer and further adapted to dispense water; a second pump adapted to receive a second control signal from a computer and further adapted to dispense chemicals; a first flow meter mounted downstream from the first pump and adapted to send a first measurement signal proportional to the amount of water dispensed; a second flow meter mounted downstream from the second pump and adapted to send a second measurement signal proportional to the amount of chemical dispensed; and a computer adapted to send the first control signal to the first pump and the second control signal to the second pump, and adapted to receive the first measurement signal and the second measurement signal, the computer further adapted to compare the second control signal with the second measurement signal to determine if a pumping fault has occurred, and the computer further adapted to record the amount of water and the amount of chemical dispensed.

The advantages of the present invention are that chemicals may be dispensed more accurately than with manual methods. Chemicals may be added to concrete during the mixing stage that is not operator dependent and has increased repeatability from batch to batch. The chemicals may be dispensed over a controlled period of time, allowing a more complete and homogenous mixture. Further, a computer may accurately record and certify the amount of chemicals added to each batch of concrete, providing a record of each batch for certification or other uses. Problems with chemical dispensing can be detected quickly so that batches of concrete are not wasted when a problem occurs. In addition, aggregate and concrete are thoroughly mixed as dry components and are conveyed to a dispensing head which dispenses the dry mixture, water and chemicals. Thorough mixing of the dry components reduces wet mixing and ensures proper mixing in correct proportions.

DETAILED DESCRIPTION OF THE INVENTION

Figure 1:
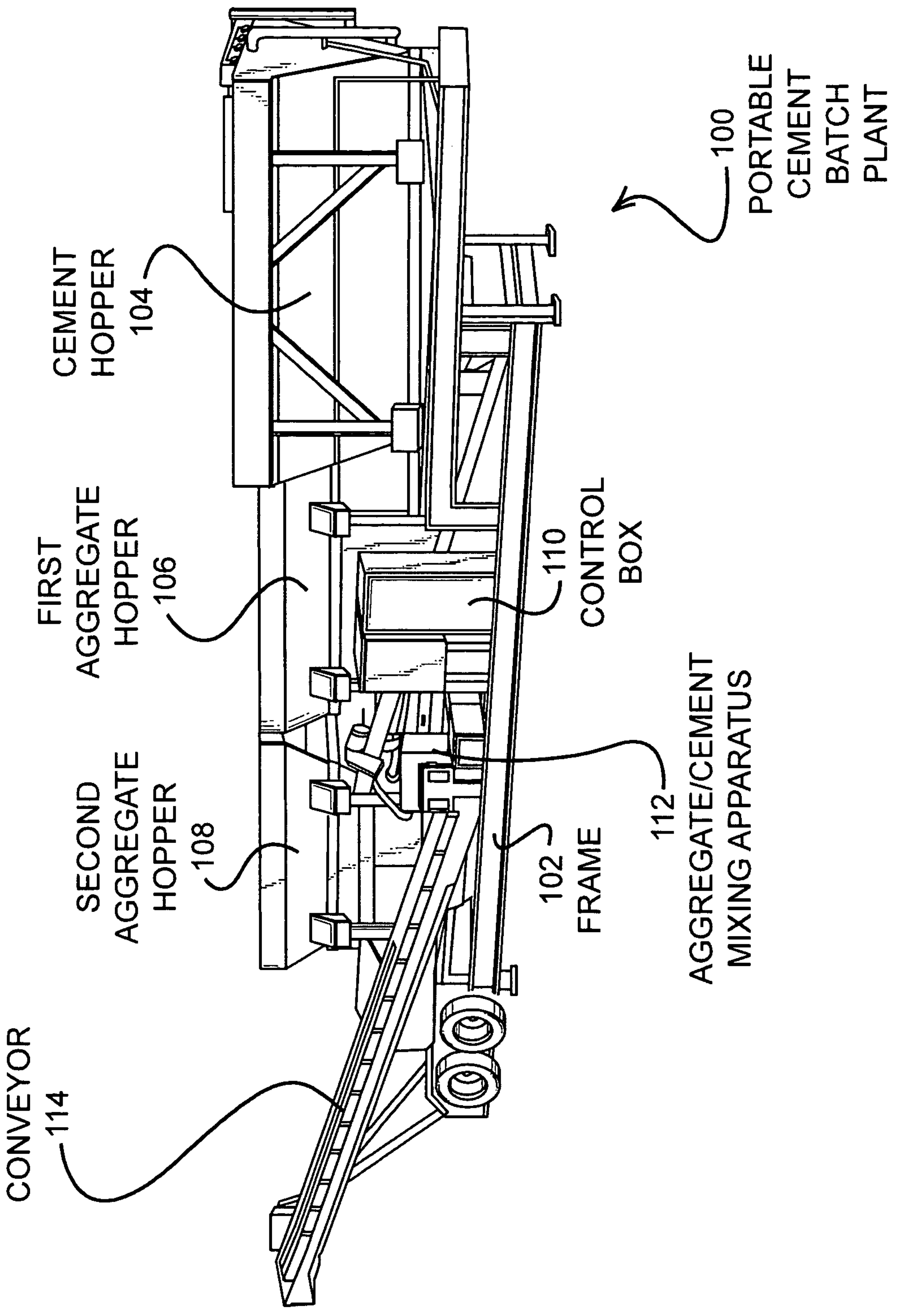
FIG. 1 is an illustration of an embodiment of the present invention of a portable concrete batch plant that has an automated chemical dispensing system.

FIG. 1 illustrates an embodiment 100 of the present invention of a portable cement batch plant that has an automated chemical dispensing system. The frame 102 has several hoppers mounted thereupon: a cement hopper 104, a first aggregate hopper 106, and a second aggregate hopper 108. The control box 110 contains a computerized control system that directs the dispensing of the various dry materials, such as cement, sand, and rock, into a dry mixing apparatus 112 and a conveyor 114. The conveyor 114 may deliver the pre-mixed dry components into a portable concrete mixer truck.

The plant 100 is designed to charge a concrete mixing truck with a batch of raw materials per a certain specification based on a mix design. The specification may include a certain amount of dry ingredients, such as cement, rock, and sand, as well as certain amounts of water and various chemical agents typically added to concrete mixes. These agents may include water reducing agents, stabilizers, retarding agents, anti-freeze agents, wetting agents, colorants, plasticizers, accelerants, and other chemicals as needed to impart specific properties to the batch of concrete.

The specifications of each batch of concrete may be tightly controlled. For example, if the concrete were to be used for making structural members, such as prestressed concrete beams or the like, the exact proportion of the ingredients, plus the homogeneity of the mixture may be required to meet the required structural characteristics. Each ingredient, including the individual chemical additives, must be measured and dispensed accurately. Further, the verification and recording of the ingredients and the exact amount of each ingredient may be required for quality assurance and/or regulations.

The use of computer controlled technology with the cement batch plant allows a precise measurement of each ingredient during the dispensing operation. Further, the exact amount of each ingredient may be recorded, certified, and documented without any human intervention or error. In the embodiment 100, each hopper 104, 106 and 108 is mounted on load cells that are capable of measuring the weight of the filled hopper. As the material is being dispensed, the weight of the hopper is monitored until the required weight of material has been removed from the hopper. At that point, the dispensing from the hopper is halted.

The hoppers 104, 106, and 108 may be outfitted with various devices for dispensing the dry ingredients. For example, the cement hopper 104 may be designed with a funnel and an air slide adapted to fluidize the dry cement powder. The fluidized cement powder may dispense through a butterfly valve into an auger that transfers the cement into the dry mixing apparatus 112. Many other methods exist for dispensing cement powder that would also be adaptable to the present embodiment. In another example, sand and rock may be dispensed through a weigh hopper that contains a large gate valve at the bottom of the hopper. In other embodiments, the bottom of the hopper may contain a transfer belt that may transfer aggregate out of the hopper and off of the belt. Such an embodiment may not be prone to rocks or other obstructions being caught in a conventional gate valve.

The mixing apparatus 112 mixes the various dry ingredients, such as aggregate and cement separately from the dispensing of water and chemicals into the mixing drum. The mixing apparatus 112 may contain augers or other mixing paddles to homogenize the aggregate and cement. The dry ingredients are thoroughly mixed prior to combining these ingredients with the water and chemicals which ensures a stronger and more homogeneous mixture. This process also reduces the need for extensive mixing after the dry ingredients have been added to the water and chemicals. The mixing apparatus 112 has the advantage of containing cement dust, as the dust is readily attracted to any moisture that is present on the surface of the aggregate. The mixing apparatus 112 may have a dust collection hood with a source air dust collection filter to further minimize any release of cement dust.

The dry ingredients are transferred into a cement transport truck by the conveyor 114. Water and chemicals may be dispensed into the truck by a spout mounted to the end of the conveyor 114. In general, it is preferred to dispense the water and chemicals into the mixing drum of a transport truck prior to dispensing the dry ingredients. Such a sequence may prevent sand balls or cement clumps from forming. In some cases, it is possible to add water simultaneously with the dry ingredients or to add the water after dispensing the dry ingredients.

Figure 2:
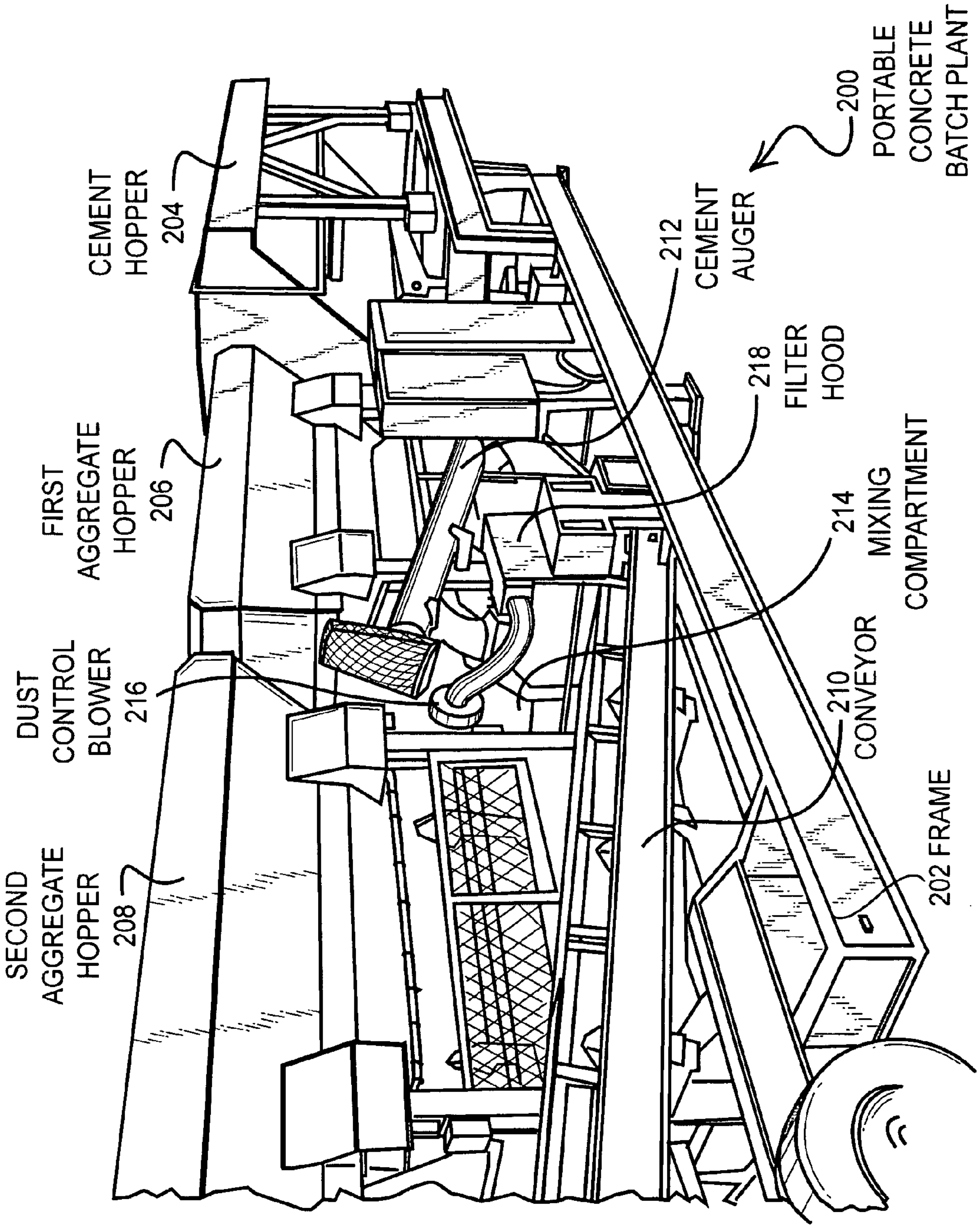
FIG. 2 is an illustration of a close up view of an embodiment of the present invention of a concrete batch plant.

FIG. 2 illustrates a close up view of an embodiment 200 of a cement batch plant. The frame 202 holds the cement hopper 204, the first aggregate hopper 206, and the second aggregate hopper 208. The delivery conveyor 210 takes the mixed aggregate and cement from the mixing apparatus 214. A cement auger 212 transfers the dry cement from the cement hopper 204 into the mixing apparatus 214. A filtered dust hood 218 is mounted near the exit of the cement auger 212 and has a dust control blower 216 for pulling any excess dust into the filter membrane contained inside the dust hood 218.

Figure 3:
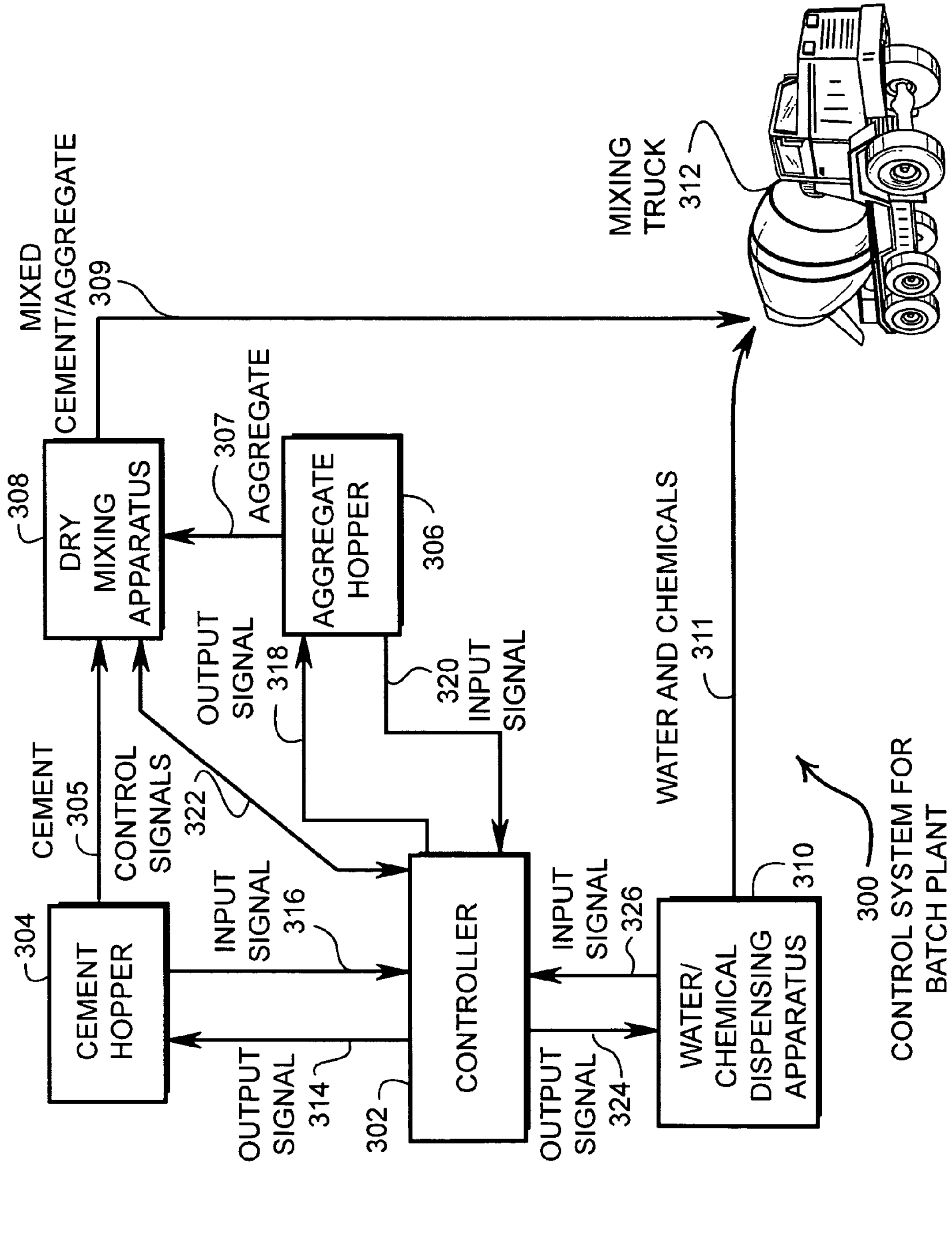
FIG. 3 is a schematic representation of an embodiment of the present invention of a control system for a typical batch plant.

FIG. 3 illustrates a schematic representation of a control system 300 for a typical batch plant. A controller 302 controls a cement hopper 304 and an aggregate hopper 306 to dispense cement 305 and aggregate 307, respectively, into a dry mixing apparatus 308, which dispenses a mixed cement and aggregate 309 into a mixing truck 312. The controller 302 also controls a water/chemical dispensing apparatus 310 to dispense water and chemicals 311 into the mixing truck 312. The cement hopper 304 is controlled by an output signal 314 and monitored with an input signal 316. Similarly, the aggregate hopper 306 is controlled by an output signal 318 and monitored with an input signal 320. The dry mixing apparatus 308 is controlled and monitored by the control signals 322. The water/chemical dispensing apparatus 310 is controlled with an output signal 324 and monitored with an input signal 326.

The controller 302 may control the cement hopper 304 or the aggregate hopper 306 by measuring the amount of material in the various hoppers to determine if enough material is present for a particular batch of concrete. The input signals 316 and 320 may include the current weight of the hopper plus the weight of the material contained in the hopper. After verifying that enough material is present, the controller 302 may cause a dispensing mechanism on the hopper to begin dispensing the material into the dry mixing apparatus 308. When the proper amount of material has been dispensed, as determined from the amount of weight removed from the hoppers, the dispensing of the hoppers is stopped. In some embodiments, the ingredients in the hoppers may be dispensed by volume and not by weight, such as by running an auger or opening a gate for a predetermined period of time or by other methods. Many different methods are possible by those skilled in the arts while maintaining within the spirit and intent of the present invention.

In some cases, the controller 302 may send one or more output signals 324 to the water/chemical dispensing system 310 to dispense water and chemicals 311 into the mixing truck 312 prior to the addition of the mixed cement and aggregate 309. In other cases, the water and chemicals 311 may be dispensed simultaneously or even after the mixed cement and aggregate 309 into the mixing truck 312.

The controller 302 may use many different methods of controlling the operation of the various components while keeping within the spirit and intent of the present invention. For example, the controller 302 may be a ladder logic PLC, a personal computer, a specialized microprocessor, dedicated weight controller, or any other computational device. The controller 302 may comprise several networked computational devices, such as a central sequencing computer that communicates to specialized computers that perform the weighing functions for the hoppers. The various input and output signals to the controller may be in the form of individual digital on/off signals, analog input and output signals, text or numerical data signals, or any other form of communication. The various components of the control system may be connected by a hard-wired network, optical communications, radio frequency communications, or any other form of communication network.

It should be noted that several aggregate, cement, fly ash, or other hoppers may be connected and controlled by the controller 302. For example, separate hoppers for sand, ½ inch gravel, 1 inch gravel, and pea gravel may be connected to the dry mixing apparatus 308.

In other embodiments, the dry mixing apparatus 308 may not be used. In such cases, the output of the various hoppers may be directly dispensed into the mixing truck 312. Such embodiments may be applicable to stationary cement plants where the cement is dispensed from a vertical cylindrical hopper that is located directly above the input to the mixing truck 312. Other mixing plants may be configured in different ways while maintaining within the spirit and intent of the present invention.

Figure 4:
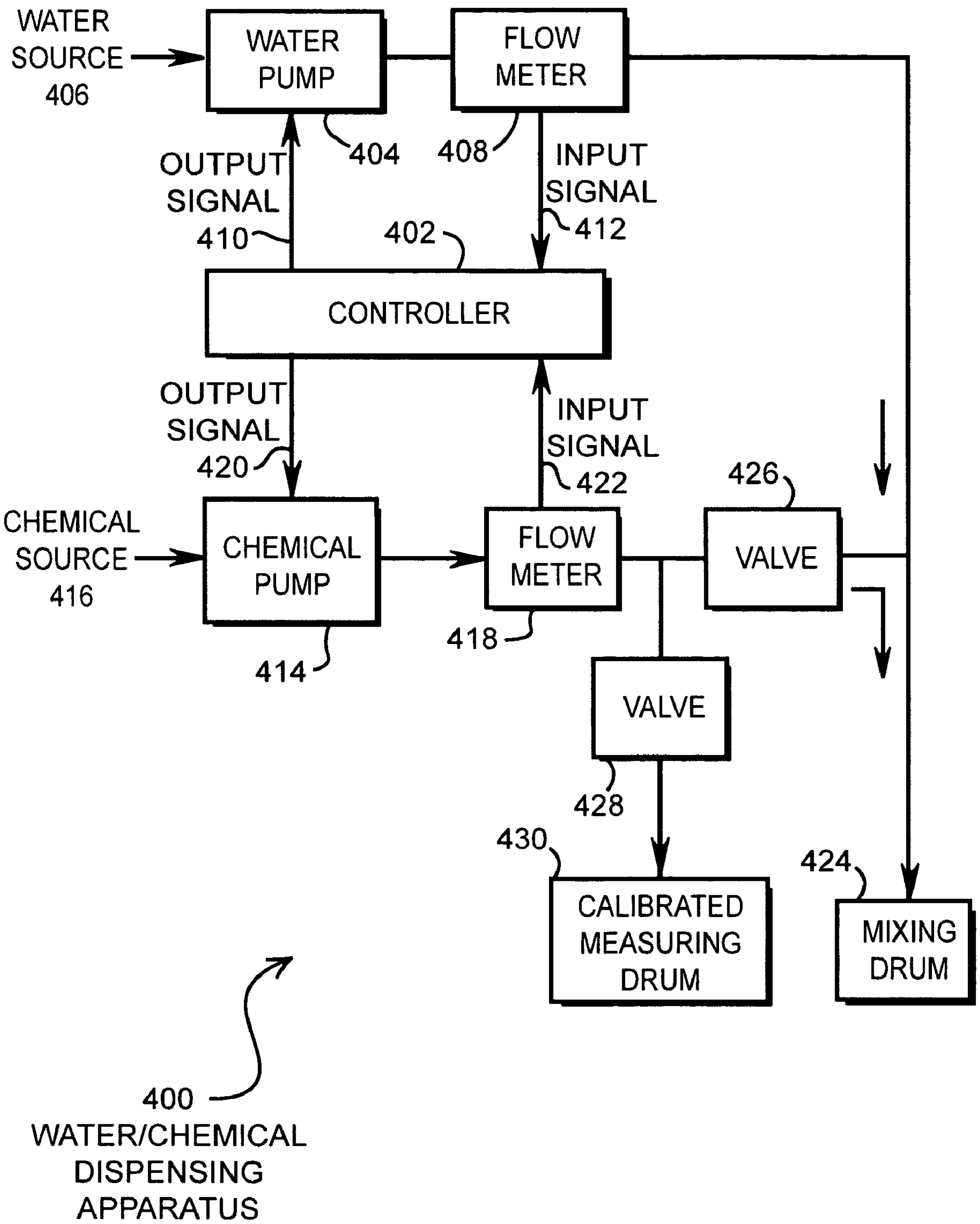
FIG. 4 is a schematic representation of an embodiment of the present invention of a water and chemical dispensing apparatus.

FIG. 4 illustrates a schematic representation of an embodiment 400 of a water and chemical dispensing apparatus. A controller 402 may control water pump 404 to pump water from a water source 406, through a flow meter 408, and into a mixing drum 424 as might be mounted on a portable mixing truck. Additionally, the controller 402 directs a chemical pump 414 to pump chemicals from a chemical source 416 through a flow meter 418 and into the mixing drum 424. A pair of valves 426 and 428 may be operated to direct the chemical output into a calibrated measurement container 430.

For both the water circuit and the chemical circuit, the liquid materials are mechanically pumped and the output is monitored by a flow meter. The flow meter serves to measure the proper amount of water or chemical that is dispensed.

The pumps used in the apparatus 400 may be positive or variable displacement pumps. Sending a stream of pulses to the controller 402 may cause such pumps to pump a certain volume of fluid. For each pulse, the pump rotates a discrete amount, causing a known volume of fluid to be moved. In such cases, the downstream flow meter will indicate the amount of fluid actually pumped and can be compared to the controllers preset value to determine if a fault had occurred with the pump. For example, if a series of pulses were sent from the flow meter sufficient to dispense one gallon of liquid and the controller 402 determined that only a small fraction of a gallon passed the flow meter, this would indicate that a fault existed. The fault may be due to an obstruction in the line or may be due to exhausting the supply of chemicals upstream from the pump. In either case, the controller 402 may turn off the pump and alert the batch plant operator that only a limited amount of chemical has been dispensed. Appropriate action can be taken to complete the batch cycle and then to repair the deficiency so that automatic batching can continue.

The controller 402 may determine a fault condition and cause the loading sequence of the mixing drum 424 to halt until the fault can be corrected. In some embodiments where the water and chemicals are added to the mixing drum 424 prior to any dry ingredients, an operator may be able to correct the fault by changing supply drums for the chemical. In this manner, a batch of concrete may still be loaded with the proper ingredients. If the dry material had been loaded first and a fault occurred while the chemicals and water were being added, the batch of concrete may have to be discarded since the concrete may begin to set up while the fault is being corrected.

In some cases, the flow meter control circuit may be used to turn on and off the pump or a valve after a specific volume of material has flowed past the flow meter. In such a case, a diaphragm pump, centrifugal pump, another type of pump or even gravity may be used to provide pressure to the system. The controller 402 may monitor the flow meter and cause the pump to stop. In some cases, an additional shut off valve may be used to block any further flow of liquid material. In the previous example of the positive displacement pump, no shut off valve is needed, as the design of the pump permits no flow when the pump is stopped.

In the case where the pump is not a positive displacement pump, a fault condition may exist if the amount of material sensed by the flow meter is out of range with what would normally be expected. For example, if a diaphragm pump typically pumped one gallon, the flow meter should show about one gallon. If the flow meter sensed only a portion of a gallon, a fault condition may exist.

The valves 426 and 428 may be operated to direct the flow of chemicals into a calibrated measuring drum 430. An inspector may use such a configuration to verify that the system is pumping the proper amount of chemicals. Additionally, the configuration may be used to calibrate the system.

Several different chemical circuits may be used to dispense various chemicals in the present invention. In some embodiments, a series of different sized pumps and flow meters may be employed. For example, a batch plant may have three chemical circuits, one with one inch diameter line, one with three quarters of an inch line, and one with a half inch line. Each pump system would be assigned a specific chemical depending on the concentration and volume requirements of those chemicals. Various combinations of pump sizes and numbers of chemical additive lines are envisioned while keeping within the spirit and intent of the present invention.

Figure 5:
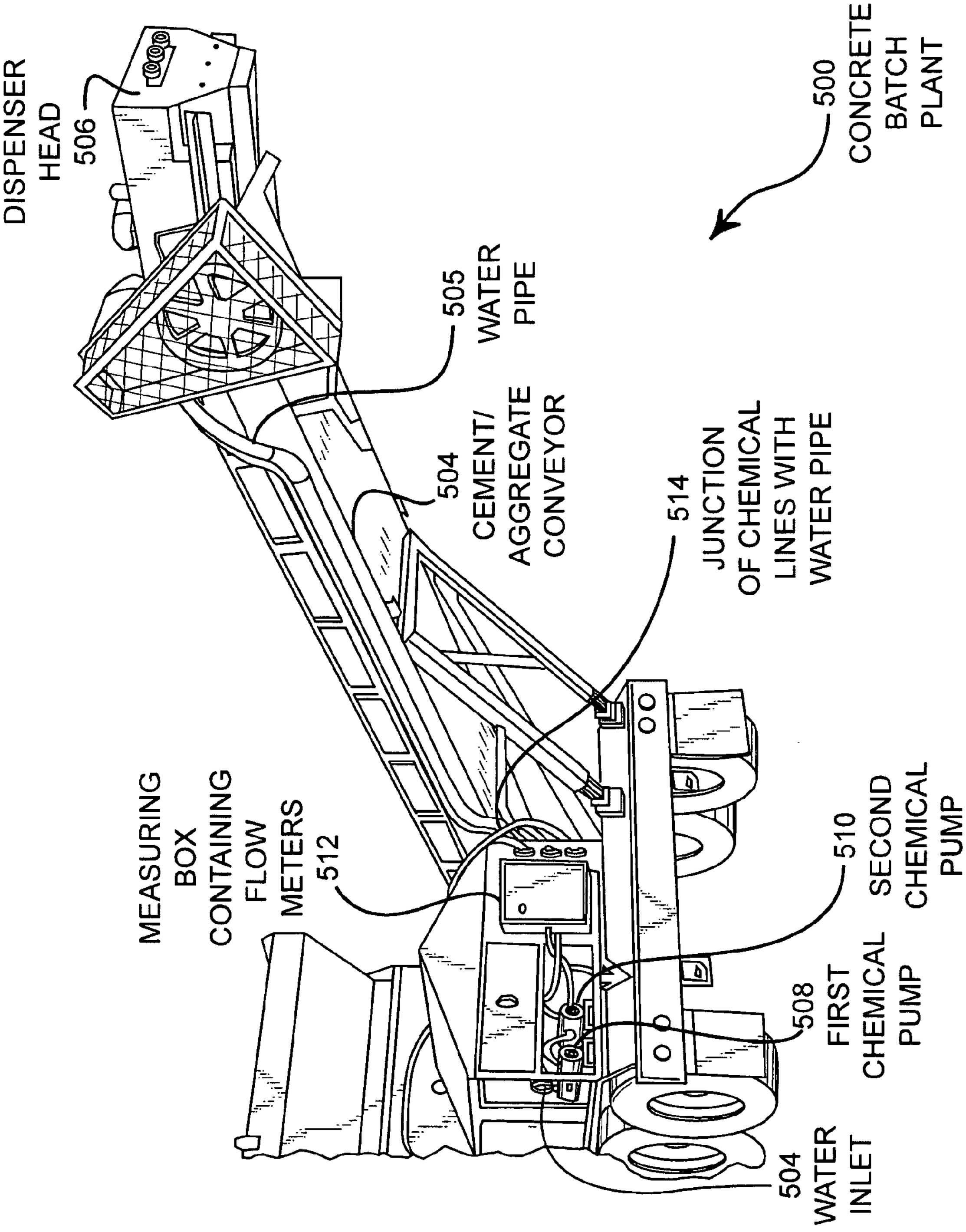
FIG. 5 is an illustration of an embodiment of the present invention of a chemical dispensing system of a concrete batch plant.

FIG. 5 illustrates an embodiment 500 of a concrete batch plant. A cement/aggregate conveyor 504 may carry dry ingredients to the dispensing head 506 and into the mixing drum of a transport truck (not shown). The water inlet 504 may be connected to a water source and pumped with a pump (not shown) through the water pipe 505 to the dispensing head 506. A flow meter (not shown) measures the amount of water transferred. A first chemical pump 508 and a second chemical pump 510 transfer chemicals from drums or other containers through a measuring box 512 that contains flow meters and other monitoring equipment to the junction 514 of the chemical lines with the water pipe 505.

In some cases, the various pumps and meters may be mounted on a separate frame from the mixing plant and may contain a separate controlling computer. In such cases, the separate controlling computer may only perform the dispensing, verification, and recording of the water and chemicals and may or may not be connected with a computer that controls the entire sequence of measuring, mixing, and dispensing both the wet and dry ingredients.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A chemical dispensing system for a concrete mixing plant comprising:

a first pump adapted to receive a first control signal from a computer and further adapted to dispense water;

a second pump adapted to receive a second control signal from a computer and further adapted to dispense chemicals;

a first flow meter mounted downstream from said first pump and adapted to send a first measurement signal proportional to the amount of water dispensed;

a second flow meter mounted downstream from said second pump and adapted to send a second measurement signal proportional to the amount of chemical dispensed; and a computer adapted to send said first control signal to said first pump and said second control signal to said second pump, and adapted to receive said first measurement signal and said second measurement signal, said computer further adapted to compare said second control signal with said second measurement signal to determine if a pumping fault has occurred, and said computer further adapted to record the amount of water and the amount of chemical dispensed.

* * * * *